United States Patent [19]

Palfrey et al.

[11] 4,112,589
[45] Sep. 12, 1978

[54] CONTROL SYSTEM FOR DRIER

[75] Inventors: Lesley Francis Palfrey, Havant; Ronald John Fellows, Portsmouth, both of England

[73] Assignee: Thorn Domestic Appliances (Electrical) Ltd., London, England

[21] Appl. No.: 727,015

[22] Filed: Sep. 27, 1976

[51] Int. Cl.² ........................................... F26B 19/00
[52] U.S. Cl. ........................................ 34/48; 34/133; 219/497
[58] Field of Search .................. 34/48, 46, 133; 219/497, 501

[56] References Cited

U.S. PATENT DOCUMENTS

| | | | |
|---|---|---|---|
| 3,302,299 | 2/1967 | Scherzinger | 34/48 |
| 3,401,464 | 9/1968 | Fogt et al. | 34/48 |
| 3,526,968 | 9/1970 | Triplett | 34/48 |
| 3,648,077 | 3/1972 | Evalds | 307/252 B |
| 3,649,853 | 3/1972 | Kerchner | 307/252 B |
| 3,700,933 | 10/1972 | Harkenrider et al. | 307/252 B |
| 3,801,832 | 4/1974 | Joyce | 307/252 B |

*Primary Examiner*—John J. Camby
*Assistant Examiner*—Larry I. Schwartz
*Attorney, Agent, or Firm*—Lewis H. Eslinger

[57] ABSTRACT

An air drier comprises a chamber in which articles are placed for drying, a blower for causing air to pass through the chamber, a heater for heating the air entering the chamber and a control circuit which includes sensors for detecting the ambient air temperature and that of air leaving the chamber. The control circuit is adapted to control the power supplied to the heater in dependence on the detected temperature difference. The control circuit has an economy switch which when operated causes the circuit to maintain the exhaust air temperature at a temperature only slightly above ambient, and a detector which monitors the power supplied to the heaters and interrupts the drying cycle when the power drops below a predetermined value.

8 Claims, 4 Drawing Figures

CONTROL SYSTEM FOR DRIER

The present invention relates to driers and more particularly to air driers, i.e. driers which include a chamber in which articles to be dried are placed and means for passing heated air through the chamber.

A typical air drier for drying articles such as clothes, comprises an outer casing, a rotatable drum within the casing, a fan for drawing air in through the casing and passing it to the drum and an outlet duct for exhausting the air from the drum to the atmosphere. Usually, driers of this type have one or more electrical heating elements located in the inlet air duct to heat the air before it passes to the drum. Conventionally, driers of this type have a main on/off switch, an adjustable timer so that the user can select any one of a range of drying times, and a heating control switch which varies the amount of power supplied to the heating elements. Such a heating control switch usually operates by switching a plurality of separate heating elements into various series and parallel configurations to vary the power dissipated in the elements.

Although driers of this type can often dry articles such as clothes very quickly, they suffer from various disadvantages, principally that (a) it is not possible usually to control the dryness of the articles when drying is completed, this usually being a matter of guesswork on the part of the user, and (b) such driers usually consume large amounts of power, even at a relatively low heat setting.

According to the present invention, there is provided an air drier comprising a chamber in which, in use, articles are placed for drying, means for causing air to pass through the chamber, means for heating the air entering the chamber, and a controller for controlling the amount of heat supplied to said air entering the chamber in dependence on the difference between the temperature of air leaving the drier and that of ambient air.

Preferably the drier has a control circuit which operates so that the heat supplied by the heating element is varied in such a way that the difference between the exhaust air temperature and the ambient air temperature remains substantially constant throughout the drying time. Suitably the difference in the two temperatures is in the range 0° to 2° C., the exhaust air being at a higher temperature than the ambient air. This results in a very much reduced power consumption per drying cycle as compared with conventional driers although, of course, rather longer drying times are required to achieve the same degree of dryness.

In a preferred embodiment the heating means comprises one or more electrical heating elements and the power supplied by them is varied by controlling the current supplied to the heating element by means of a semiconductor switch, for example an SCR or a triac. A control circuit is provided which controls the semiconductor switch so that the difference between exhaust air and ambient air temperatures remains substantially constant at a desired value. Suitably the ambient air temperature can be measured by placing a temperature sensor in the inlet air duct of the drier and the exhaust air temperature can be measured by placing a temperature sensor in the exhaust air duct of the drier.

Since the temperature difference is used to control the heating rate of the incoming air, the drier is insensitive to supply voltage fluctuations and also to variations in the load in the drier chamber and in the material of and degree of dampness of the articles being dried. Furthermore, by ensuring that the exhaust air temperature is only slightly above the ambient air temperature, the humidity in the exhaust air stream is reduced, thus alleviating the problem of condensation on various parts of the drier downstream of the drier chamber.

The power required to maintain the temperature differential remains substantially constant over a large part of the drying cycle, and towards the end of the drying cycle, the power required decreases steadily as progressively more moisture is removed from the articles being dried. The steady decrease in the power consumption towards the end of the drying cycle makes it possible easily to control the dryness of the articles at the end of the drying cycle simply by monitoring the power required and turning the drier off when the power required has dropped to a predetermined level.

The problem of "over-drying", that is to say removing the natural moisture of the material being dried, is very much reduced. Also reduced is the problem of creasing which occurs with both fabrics of man-made fibres and natural fibres when dried in conventional hot air driers which have an exhaust air temperature which is substantially above the ambient air temperature.

In order that the invention may be more fully understood, the following description is given, merely by way of example, reference being made to the accompanying drawings in which.

Figure 1:
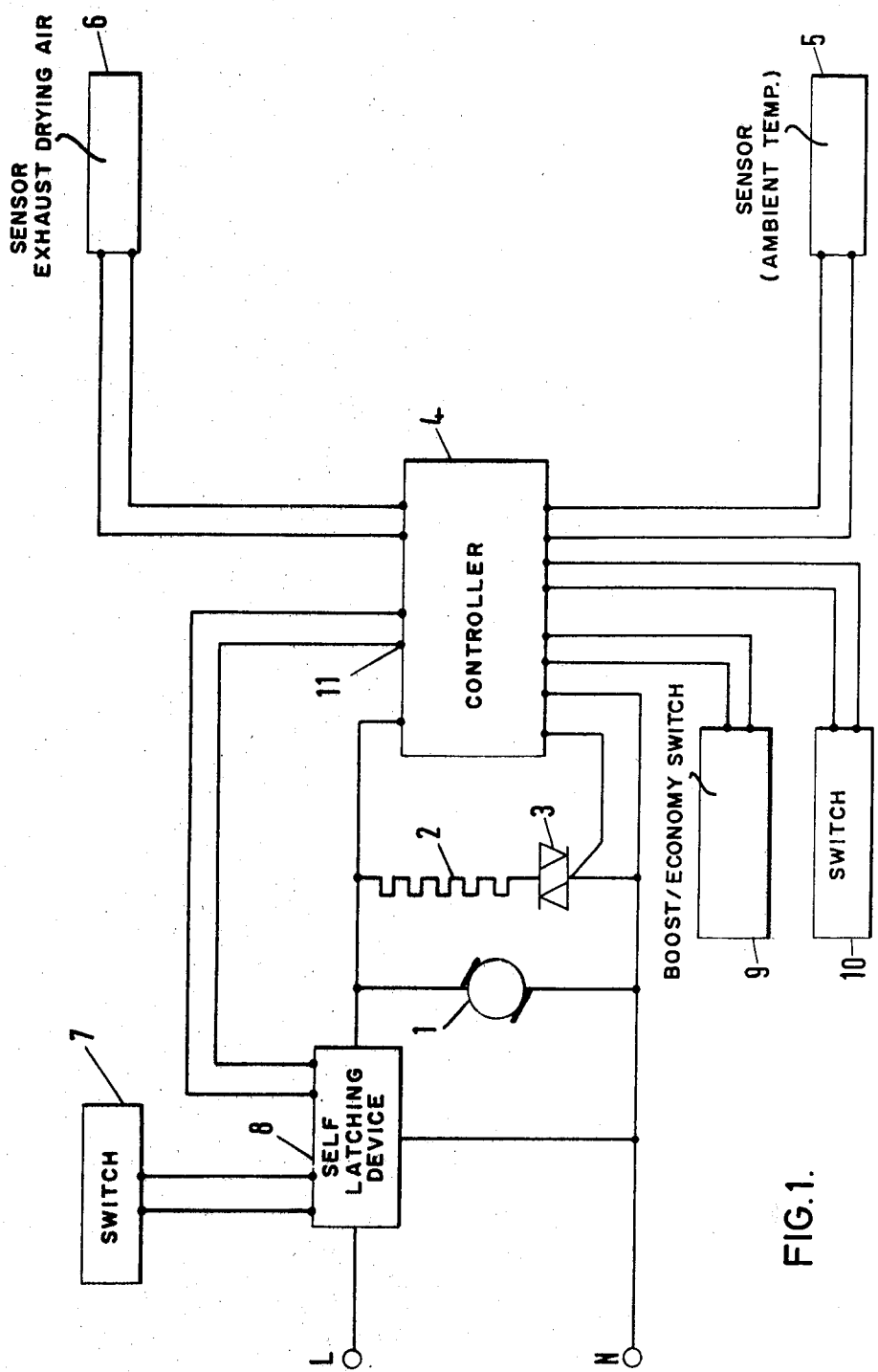
FIG. 1 is a schematic circuit diagram of one embodiment of the present invention.

Shown in the Figures is a tumbler drier having a fan motor 1 which drives a fan which draws air in through an inlet opening 20 in the casing 21 of the tumbler drier and passes it through the drying chamber 23 to an exhaust outlet 22 in the drier casing 21. The tumbler drier is of the type in which the chamber 23 is a rotatable drum in which the articles to be dried are placed, and the motor 1 can suitably also provide the drive for the drum. Before it passes into the drying chamber 23, air drawn into the tumbler drier by the fan is heated by heater 2, which is suitably an electrical heating element. The electric current delivered to the heater 2 from the alternating supply L-N is regulated by triac 3 which is operated in the known "burst-fire" mode, being gated by a controller 4.

The live supply line L is connected to the motor 1, heater 2 and controller 4 via a self latching device 8, which is suitably a latching relay which is caused to latch on by means of a "push-to-make" switch 7. Output lines 11 from controller 4 are energisable at the end of the drying cycle to cause the self latching device 8 to unlatch, thus interrupting the supply to the motor 1, heater 2 and controller 4.

Two temperature sensors 5 and 6 are provided, both suitably being negative temperature coefficient resistors or thermocouples, sensor 5 being positioned to sense the ambient temperature and sensor 6 being positioned to sense the temperature of the air as it leaves the drying chamber. For this purpose, the sensor 5 is suitably located in the inlet ducting of the drier and sensor 6 is suitably located in the outlet duct.

The controller 4 is adapted so that the rate at which gating pulses are delivered to the gate of triac 3 is controlled in proportion to the difference or "error" between a "demanded" temperature difference and the actual difference in the temperatures sensed by sensors 5 and 6 respectively, and the control is carried out in such manner as to maintain the temperature difference substantially constant suitably with the exhaust air temperature being 1° or 2° C. above ambient temperature.

Figure 3:
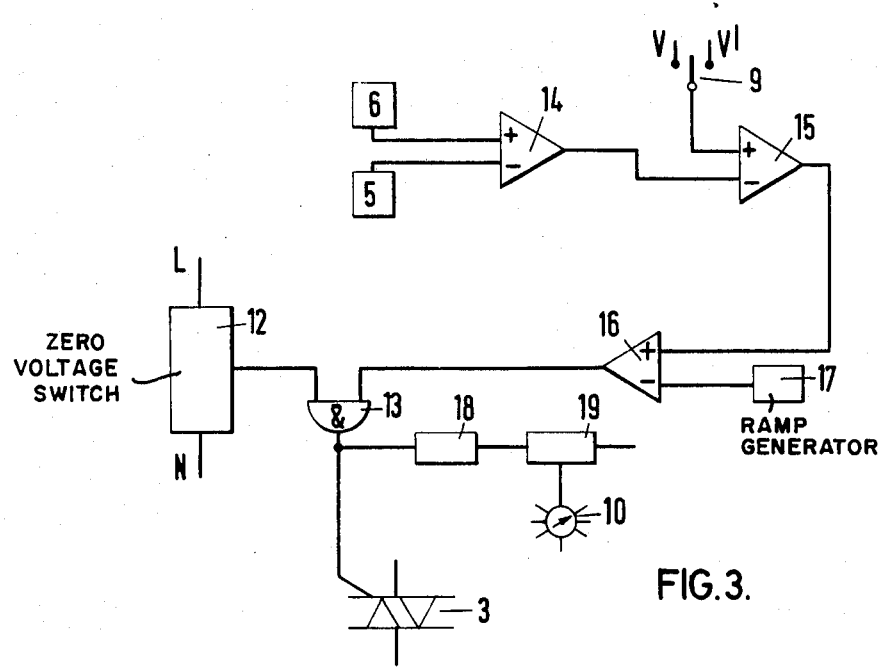
FIG. 3 is a schematic circuit diagram of the controller of the embodiment of FIG. 1.
Figure 4:
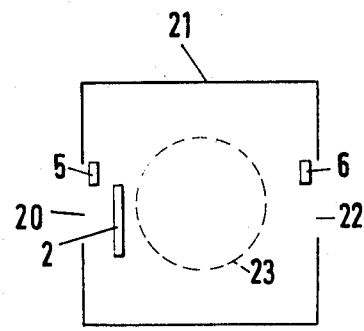
FIG. 4 is a somewhat schematic vertical section through the drier of FIG. 1.

As shown in FIG. 3, the controller 4 suitably includes a "zero-voltage switch" 12 of a known type which produces output pulses as the alternating current supply voltage changes polarity. These "cross-over pulses" are suitably delivered to the gate of triac 3 via a gate 13 which is controlled in response to the temperature differential.

A comparator 15 produces a difference signal corresponding to the difference between the temperatures sensed by the sensors 5 and 6 and this difference signal is compared with a voltage "V" corresponding to a reference or "demanded" temperature differential by comparator 15 to produce an "error" signal. This error signal is used to cause triac 3 to be gated in such manner that the heater 2 supplies heat to the incoming air to restore the error signal to substantially zero.

The error signal appearing at the output of comparator 15 is delivered to one input of a further comparator 16, the other input of which is supplied with the output of a free running ramp generator 17 which has a time period considerably longer than the time period of the alternating currents supply. Comparator 16 produces a logical "1" output while the error voltage is less than the instantaneous ramp voltage and a logical "0" when the ramp voltage exceeds the error signal so that it produces an output pulse train, of which the pulse widths are proportional to the error signal. This pulse width modulated signal is combined with the output pulses of the zero voltage switch 12 by the AND gate 13 so that the triac 3 is gated-on in the burst fire mode in such manner as to maintain the temperature differential between the ambient air and the exhaust air substantially constant.

Shown at 9 is a user operable boost/economy switch which varies the mode in which the controller 4 operates. In the economy mode, controller 4 acts to maintain the exhaust air at a temperature which is only slightly, e.g. 1° or 2° C., above the ambient air temperature while in the boost mode the controller 4 acts to maintain the temperature differential at a substantially higher value so that more rapid drying can be achieved, should this be required by the user. The boost mode is achieved by altering the demanded temperature differential to a higher value "V¹".

Figure 2:
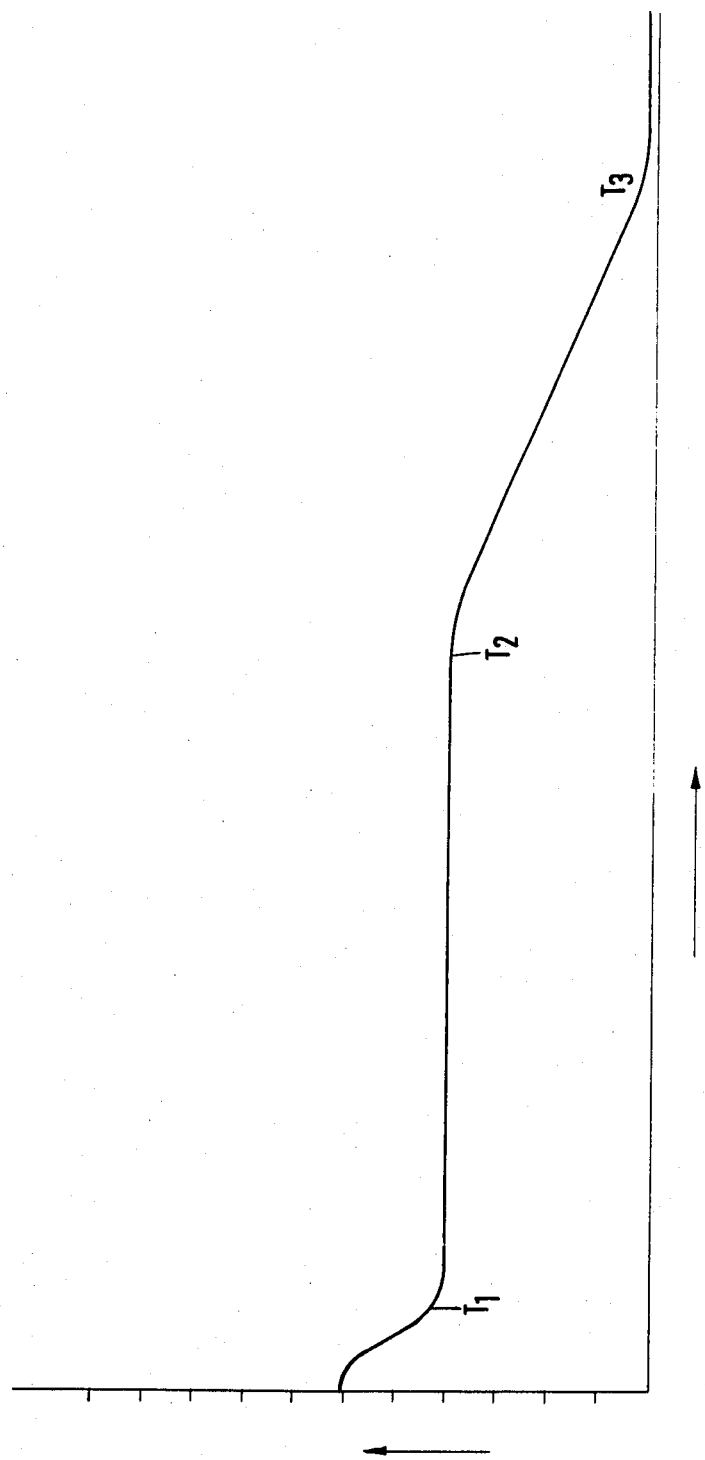
FIG. 2 is a graph showing how the power required to maintain the required temperature differential varies with time during the drying cycle.

FIG. 2 is a graph relating the power required to maintain the required temperature differential in the economy mode with the drying time as the drying cycle progresses. As can be seen, initially a fairly large amount of power is required to maintain the temperature differential, as during this time $(O-T_1)$ the drier itself, the articles contained therein and, of course, the water in the articles needs to be heated up to working temperature. After this heating has taken place a period $(T_1-T_2)$ follows in which a substantially constant amount of power is required as the water is evaporated from the articles being dried. During the end portion $(T_2-T_3)$ of the drying cycle the power required to maintain the temperature differential decreases rapidly and eventually reaches a substantially constant low level which represents the power required to maintain the interior of the drier at the desired level above ambient temperature.

When the drying cycle is complete, a signal appears at the output 11 of controller 4 which causes the self latching device 8 to unlatch, thus interrupting the current supply to the drier and bringing the drying cycle to an end. Clearly, one way of producing the output signal 11 is to include in the controller 4 a timer which starts to operate at the start of the drying cycle and produces an output signal when a predetermined time, which is suitably selected by the user, has elapsed. However, it is clearly much more desirable to be able to control the degree of dryness of the dried articles and this can be achieved by monitoring the power required to be supplied by the heater 2 in order to maintain the required temperature differential. As can be seen from FIG. 2, as the drying cycle proceeds after $T_2$, the power required decreases steadily as the amount of moisture remaining in the articles is reduced. Thus, by monitoring the power required and ending the drying cycle when the power required has dropped to a predetermined level, it is possible fairly accurately to dry the articles to a required dryness. The power supply by the heater 2 is proportional to the rate at which triggering pulses are delivered to the gate of triac 3 and it is thus possible to monitor the power being supplied by the heater 2 by measuring the rate at which gating pulses are delivered to the triac 3. This is achieved by delivering the gating pulses from AND gate 13 to an averaging circuit 18 the output of which is connected to a threshold switch current 19 which produces an output pulse when the output of the averaging circuit 18 falls below a predetermined value. The output of the threshold switch circuit 19 is delivered along the lines 11 to the self latching device 8 to cause it to unlatch. Suitably the threshold switch 13 has an adjustable threshold level so that the drying cycle ends when a user selectable predetermined dryness (corresponding to a particular level of power consumption) is achieved. The threshold of threshold circuit 19 can either be continuously variable or be adjustable through a range of predetermined values by means of a user operable switch 10.

We claim:

1. An air drier comprising: a housing; a chamber in the housing and in which, in use, articles are placed for drying; means for causing air to pass through the chamber; an inlet and an outlet for said air passing through said chamber; means for heating the air entering the chamber; and a controller for controlling the amount of heat supplied, during a drying cycle of the drier, to said incoming air by said heating means, the controller comprising first and second sensors for detecting the temperature of air leaving the chamber and the temperature of ambient air and a circuit for controlling said amount of heat in dependence on the detected difference in said temperatures, the circuit being effective to maintain said difference at a substantially constant value throughout the drying cycle.

2. An air drier according to claim 1, wherein the controller further comprises a circuit for monitoring the power supplied to the heating means and for interrupting the drying cycle once the power falls below a predetermined value.

3. An air drier according to claim 1, wherein the heating means is electrically operable and the controller further comprises a triac for controlling the current supplied to the heating means via the triac and a gating circuit for operating the triac in the burst-fire mode in accordance with said detected difference in temperatures.

4. An air drier according to claim 1, wherein the second sensor for monitoring ambient air temperature is disposed in the path of air entering said inlet chamber and the first sensor is disposed within the air outlet from the chamber.

5. An air drier according to claim 4, wherein the controller further comprises means for producing an electrical signal proportional to the difference in temperatures monitored by the sensors and means for comparing said electrical signal with a reference signal representative of a desired temperature difference to produce a further electrical signal, the controller further being arranged to control the power supply to said heating means in accordance with said further electrical signal.

6. An air drier according to claim 5, and further comprising a user operable control for changing the effective value of the reference signal.

7. An air drier according to claim 1, wherein said circuit comprises user-operable switch means selectively operable and effective, in a first position to cause said difference to be maintained at a first value, the first value being not more than 2° C. and, in a second position to cause the difference to be maintained at a substantially higher value.

8. An air drier comprising: a housing; a chamber in the housing and in which, in use, articles are placed for drying; means for causing air to pass through the chamber; an air inlet and an air outlet for said air passing through said chamber; means for heating the air entering the chamber; and a controller for controlling the amount of heat supplied, during a drying cycle of the drier, to said incoming air by said heating means, the controller comprising first and seconed sensors for detecting the temperature of air leaving the chamber and the temperature of ambient air and a circuit for controlling said amount of heat in dependence upon the detected difference in said temperatures, the circuit comprising means for producing an electrical signal proportional to the detected difference, means for comparing said electrical signal with a reference signal representative of a desired temperature difference to produce a further electrical signal and a user-operable control for changing the effective value of the reference signal, the controller being arranged to control the power supply to said heating means in accordance with said further electrical signal and being effective to maintain said detected difference at a substantially constant value throughout the drying cycle.

* * * * *